(12) United States Patent
Pizzuto

(10) Patent No.: US 7,198,428 B2
(45) Date of Patent: Apr. 3, 2007

(54) COMMINUTION MACHINE

(75) Inventor: Gian-franco Pizzuto, Fondo (IT)

(73) Assignee: FAE Italia S.r.L., Fondo (IT)

( * ) Notice: Subject to any disclaimer, the term of this patent is extended or adjusted under 35 U.S.C. 154(b) by 0 days.

(21) Appl. No.: 10/491,595

(22) PCT Filed: Oct. 7, 2002

(86) PCT No.: PCT/EP02/11228

§ 371 (c)(1),
(2), (4) Date: Oct. 4, 2004

(87) PCT Pub. No.: WO03/031725

PCT Pub. Date: Apr. 17, 2003

(65) Prior Publication Data

US 2005/0045756 A1    Mar. 3, 2005

(30) Foreign Application Priority Data

Oct. 5, 2001   (DE) .......................... 201 16 343 U

(51) Int. Cl.
*A01B 5/00*   (2006.01)

(52) U.S. Cl. .................... 404/90; 404/96; 172/180; 172/194

(58) Field of Classification Search ............. 172/140, 172/168, 174, 177, 180, 193, 194; 404/90, 404/96
See application file for complete search history.

(56) References Cited

U.S. PATENT DOCUMENTS

| 2,036,598 | A | * | 4/1936 | Miller et al. ................ 172/778 |
| 2,891,335 | A | * | 6/1959 | Linneman ................... 37/142.5 |
| 3,136,078 | A | * | 6/1964 | Renault ...................... 172/547 |
| 3,540,360 | A | * | 11/1970 | Swisher, Jr. et al. ........ 404/84.2 |
| D220,173 | S | * | 3/1971 | Swisher et al. .............. D15/25 |
| 3,732,023 | A |   | 5/1973 | Rank et al. |
| 3,735,818 | A | * | 5/1973 | Swisher et al. ............. 172/785 |
| 3,750,758 | A |   | 8/1973 | Bancel |
| 4,186,968 | A | * | 2/1980 | Barton ....................... 299/39.2 |
| 4,257,487 | A | * | 3/1981 | Brown ....................... 172/140 |
| 5,413,286 | A |   | 5/1995 | Bateman |
| 5,562,365 | A | * | 10/1996 | Berrange .................... 405/271 |

FOREIGN PATENT DOCUMENTS

| DE | 3 101 216 | 9/1982 |
| DE | 36 31 216 | 3/1988 |
| DE | 297 20 261 | 1/1998 |
| DE | 200 21 216 | 12/2000 |
| EP | 0 348 510 | 1/1990 |

\* cited by examiner

*Primary Examiner*—Gary S Hartmann
(74) *Attorney, Agent, or Firm*—Lowe, Hauptman, & Berner LLP

(57) ABSTRACT

A comminution machine included in an earth working machine which can be moved over a terrestrial area to be worked in a direction of working comprises a rotating roller comminution device. A grader blade is mounted on the comminution machine down stream from the comminution device in the direction of working.

2 Claims, 3 Drawing Sheets

COMMINUTION MACHINE

RELATED APPLICATIONS

The present application is a national phase application of PCT/EP2002/11228, filed Oct. 7, 2002, and claims priority to German Application Serial Number 201 16 343.8, filed Oct. 5, 2001, the disclosures of both of which are hereby incorporated by reference herein in its entirety.

The invention relates to a comminution machine, in particular a stone mill.

For example, stone mills are used for working earth on which stones of various sizes are lying, the intention being for these stones to be comminuted as intensely as possible.

A known comminution machine of this type (DE-A-3101216) is configured as a marginal-strip finisher, as it is known, which is provided with a grader blade. This grader blade comprises two plate-like parts, which overlap each other and can be displaced relative to each other. In this case, these plate-like parts of the known grader blade merely extend laterally of the known marginal-strip finisher, since only lateral marginal-strip finishing or renewal is envisaged.

The known marginal-strip finisher has no kind of specific devices for influencing the grader blade. This is not required either, since the compaction of the earth is intended to be carried out by means of separate rollers.

The invention is based on the object of improving a comminution machine of the aforementioned type with regard to earth working and expanding it with regard to the area of use.

According to the invention, this object is achieved by a comminution machine of the aforementioned type having the features contained in the single patent claim.

The comminution machine according to the invention, in particular a stone mill, which can be moved over earth to be worked in a direction of working, is provided with a comminution device, in particular a rotating roller, a grader blade, which is provided on the comminution device and arranged downstream of the latter in the direction of working, an actuating device by means of which the grader blade is fixed to the comminution device and can be lowered as far as the earth worked by the comminution machine and can be pressed with a predetermined force against the earth worked by the comminution machine, and with a positioning device, which is arranged between the grader blade and its actuating device and by means of which the grader blade, firstly, can be tilted about an axis running in the direction of working and parallel to the earth worked and, secondly, can be pivoted about an axis perpendicular to the earth worked, and can be fixed in any desired position within the tilting or pivoting range.

With the comminution machine configured according to the invention, amongst other things the advantage is achieved that, at the same time as the earth is worked, leveling or grading is carried out. In the configuration of the comminution machine as a stone mill, it is thus possible to mill the stones at the same time by means of the comminution device and to grade the earth worked with the grader blade, so that the material which accumulates during the comminution is distributed uniformly and evenly behind the comminution machine. As a result, the area of application of the comminution machine according to the invention is, for example, expanded to the rapid and economic production of roads which can be traveled.

The actuating device by means of which the grader blade is fixed to the comminution device is advantageously configured in such a way that the grader blade can not only be lowered as far as the earth worked by the comminution machine but can also be pressed with a predetermined force against this earth worked by the comminution machine.

Finally, the positioning device which is arranged between the grader blade and its actuating device can additionally be configured in such a way that the grader blade, firstly, can be tilted about an axis running in the direction of working and parallel to the earth worked and, secondly, can be pivoted about an axis perpendicular to the earth worked and, finally, can be fixed in any desired position within the tilting or pivoting range. This advantageously makes it possible to set the grader blade by means of the positioning device to a desired inclination of the road or of the street, for example 3–5° on either side of a central crest.

The invention will be explained in more detail in the following text using the drawing, in which.

Figure 1:
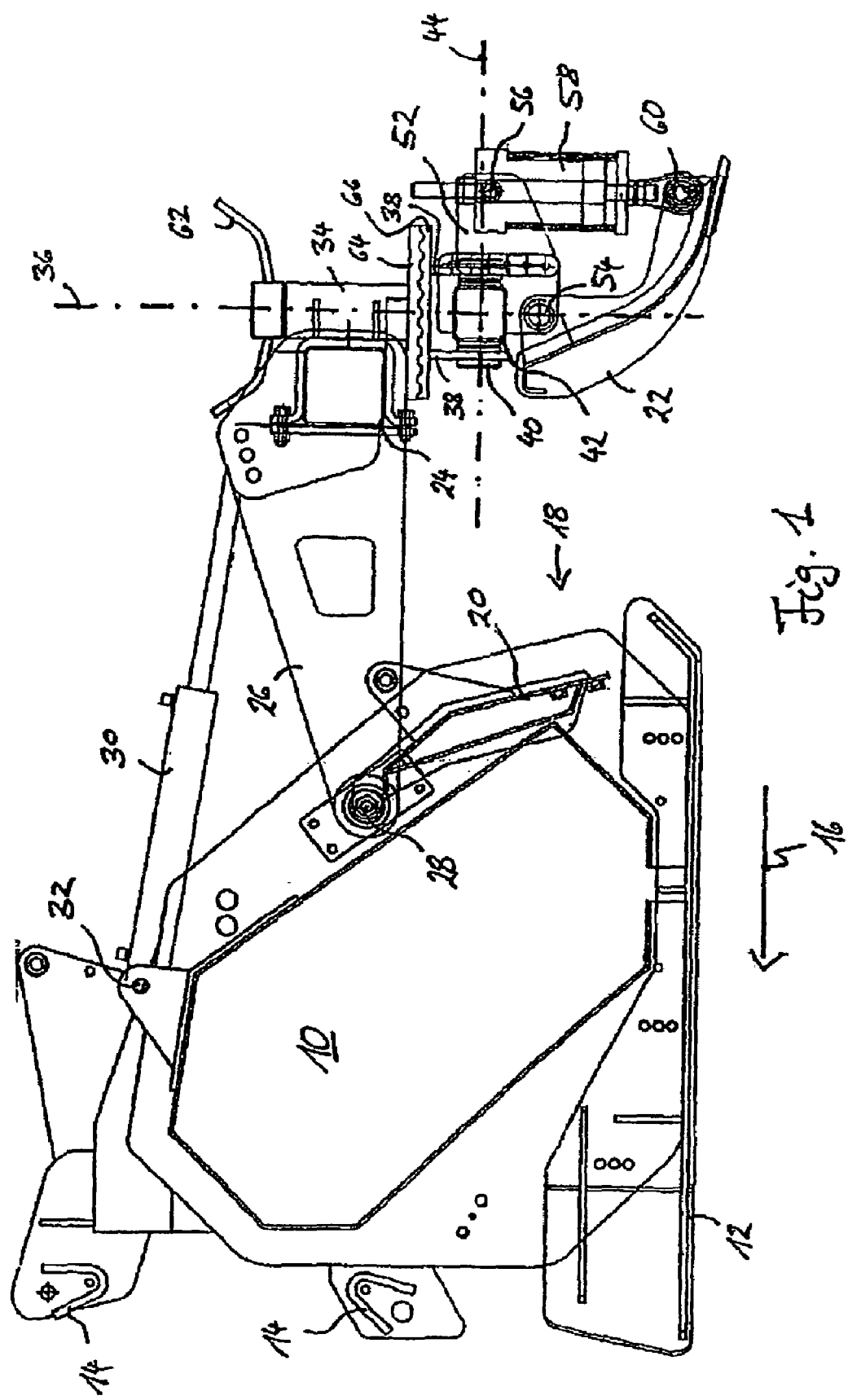
FIG. 1 shows a preferred embodiment of a comminution machine according to the invention in side view.

The preferred embodiment of a comminution machine according to the invention, illustrated in FIG. 1, comprises a comminution device, not illustrated, in the form of a rotating drum, to which milling teeth are fixed. The drum is enclosed by a housing 10 which, by means of skids 12, rests on earth to be worked. The comminution machine is detachably fixed via mountings 14 to a traction machine, not illustrated, and the traction machine pulls the comminution machine over the earth to be worked in a working direction 16, the housing 10 sliding over the ground by means of the skids 14. Within the housing 10, the milling teeth of the rotating drum act on the earth in a desired manner, for example stones in the earth are fragmented. In this case, the drum is expediently arranged in such a way that the milling teeth work a predetermined depth into the earth. At an end 18 which is opposite to the working direction 16 or at the rear of the comminution machine, the comminuted material emerges. A deflector 20 in this case prevents material fragments flying unimpeded out of the working area of the drum.

As viewed in the direction of working 16, behind the drum, that is to say downstream of the location worked by the comminution machine, according to the invention a grader blade 22 is fixed to the comminution machine. For this purpose, a mounting crossmember 24 is provided, which is attached to the housing 10 at a first point 28 by side plates 26. Furthermore, the side plates 26 are attached by hydraulic cylinders 30 at a second point 32 which is at a distance from the first point 28. In this way, telescopic extension and retraction of the hydraulic cylinder 30 leads to the mounting crossmember 24 being raised or lowered. Two hydraulic cylinders 30 are preferably provided, which form an actuating device for the grader blade 22 with respect to the raising and lowering function. By means of appropriate hydraulic pressure in the hydraulic cylinders 30 in the direction of the lowered grader blade 22, it is additionally possible to press the grader blade 22 against the earth worked, so that material leaving the housing 10 is appropriately leveled by the grader blade 22, that is to say is graded.

Figure 2:
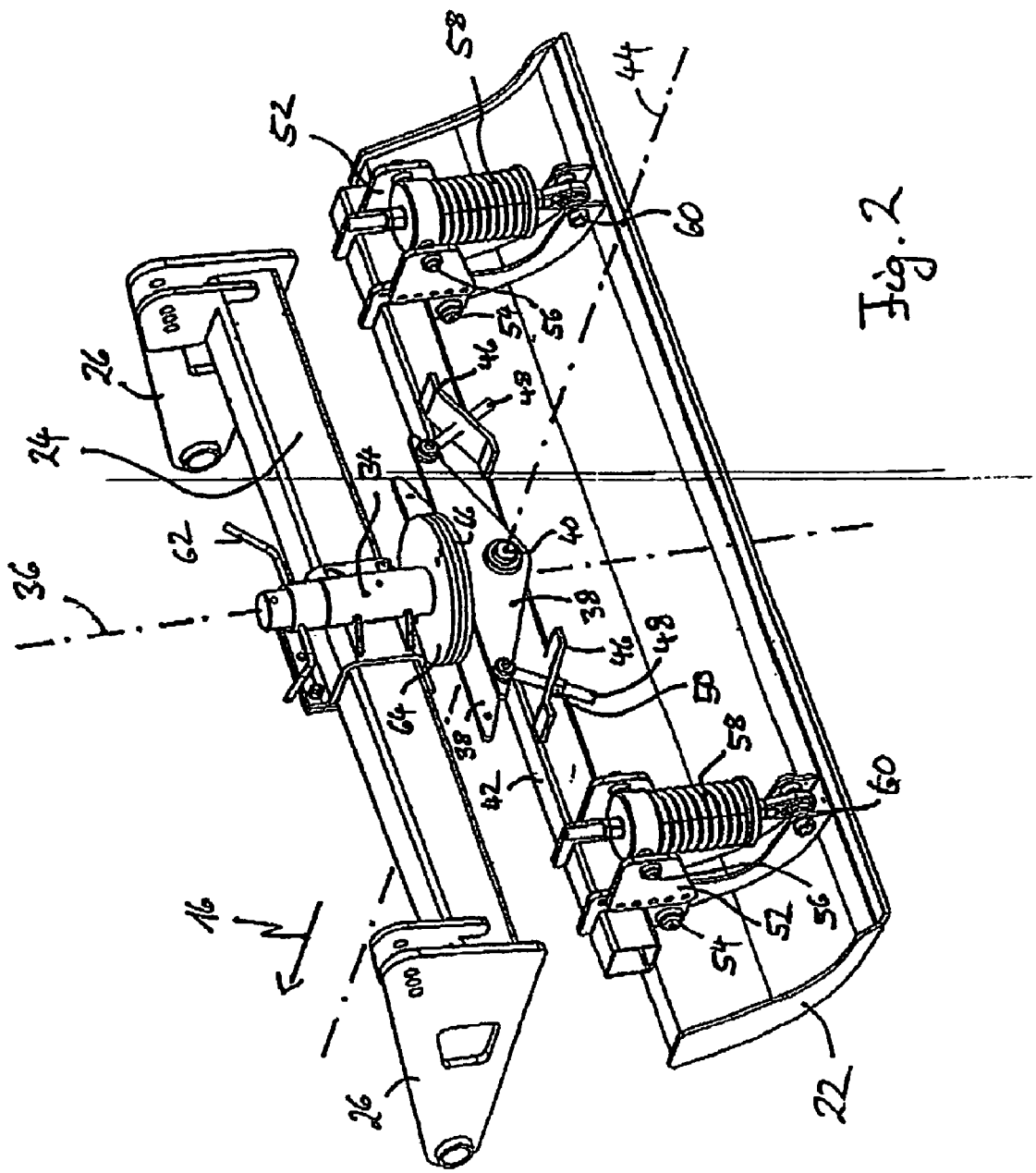
FIG. 2 shows a grader blade for the comminution machine according to FIG. 1 in a perspective view.
Figure 3:
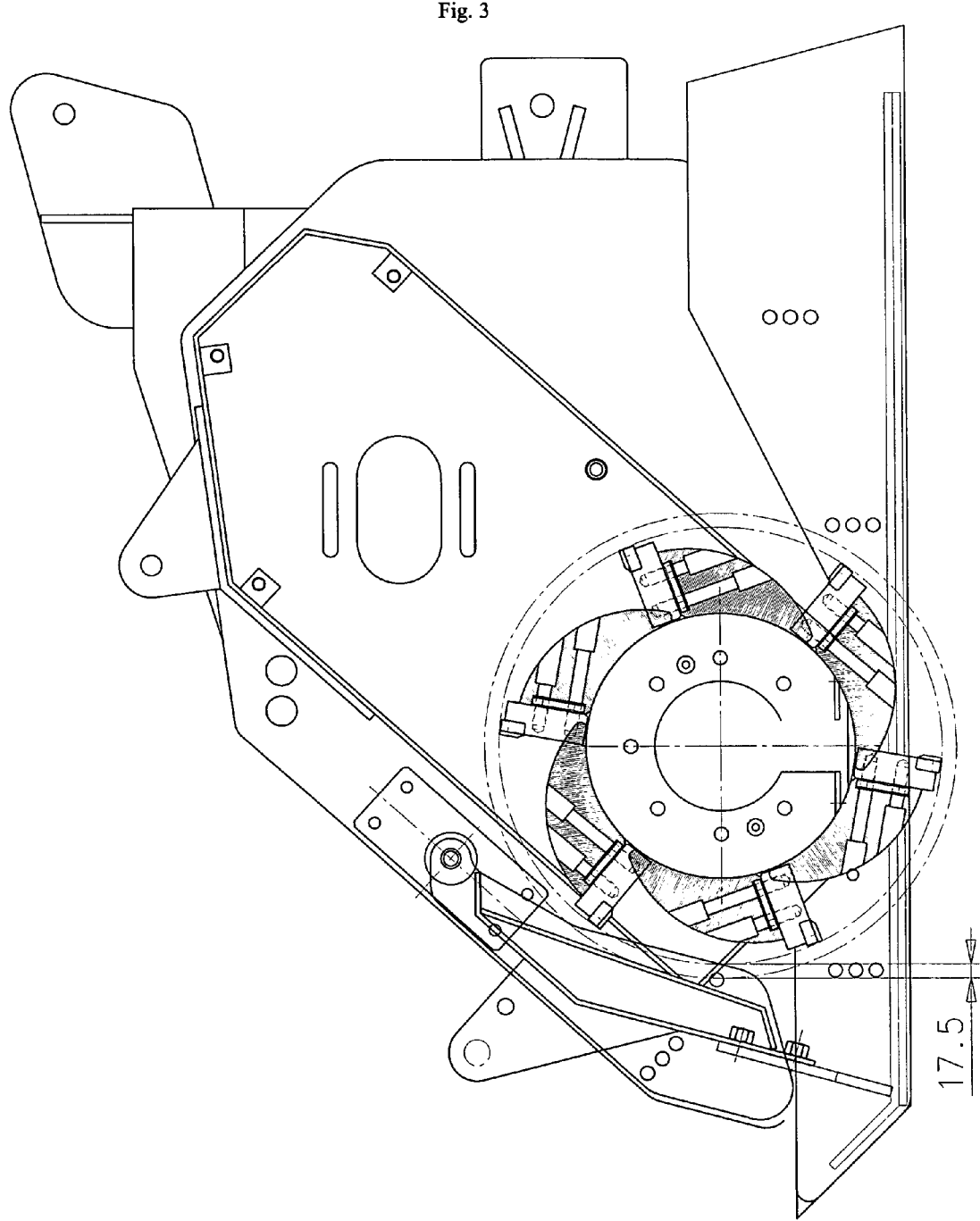
FIG. 3 is an illustration of the comminution machine of FIG. 1 with a rotatable roller.

FIG. 2 illustrates the further pivotable fixing of the grader blade 22 to the mounting crossmember 24. Fixed to the mounting crossmember 24 is a pivoting joint 34, which permits the grader blade 22 to be pivoted about an axis 36 perpendicular to the earth worked within a predetermined pivoting range. Arranged on the pivoting joint 34 are two retaining plates 38, between which a fixing crossmember 42 is attached via a pivot 40. In this way, the fixing crossmember 42 and therefore the grader blade 22 can be pivoted within a predetermined pivoting range about an axis 44 in the direction of working 16. Fixed to the fixing crossmember 42 are adjusting plates 46, in which threaded bolts 48 fixed pivotably to the retaining plates 38 engage, it being possible for a pivoted position of the grader blade about the axis 44 to be fixed by means of nuts 50 on the threaded bolts 48. The pair of axes 36, 44 define a plane parallel to the direction of working and perpendicular to the earth worked.

Finally, the grader blade 22 is fixed to the fixing crossmember 42. In this case, appropriate side plates 52 are provided, the grader blade 22 being connected directly to one side plate 52 at a pivot 54, and the grader blade 22 being connected at a further pivot 56 via a spring damper 58 to a pivot 60 on the grader blade 22 at a distance from the pivot 54. The pivot 60 is arranged at an end of the grader blade 22 which rests on the earth, so that the spring damper 58 presses the grader blade 22 in a sprung manner against the earth to be graded.

In order to pivot the grader blade 22 about the axis 36, a screw fixing for two interengaging toothed plates 64, 66 is released via a hand wheel 62, so that these toothed plates 64, 66 come out of engagement. Following adjustment of the desired pivoted position about the axis 36, the screw fixing is tightened again, so that the two toothed plates 64, 66 come into engagement again and fix this pivoted position. An appropriate pivoted position of the grader blade 22 about the axis 36 ensures that the comminuted material is distributed uniformly behind the housing 10 and excess material is transported away to the side.

In order to pivot the grader blade 22 about the axis 44, the positions of the nuts 50 on the threaded bolts 48 are changed appropriately by screwing. As a result of interaction between the nuts 50 and the adjusting plates 46, the grader blade 22 tilts in the corresponding manner. By tilting the grader blade 22 out of the plane of the earth worked, it is possible to grade a road which slopes laterally, from which rainwater runs off quickly in the desired manner.

The invention claimed is:

1. A comminution machine capable of being moved over ground to be worked in a direction of working, comprising;
    a) a comminution device including a rotatable roller;
    b) a grader blade on the comminution device, downstream of the comminution device in the direction of working;
    c) an actuating device for fixing the grader blade to the comminution device for enabling the grader blade to be lowered to the earth worked by the comminution machine, and for causing the grader blade to be pressed with a predetermined force against the earth worked by the comminution machine, and
    d) a positioning device connected to and between the grader blade and the actuating device for enabling the grader blade to be tilted independently of the comminution device about an axis extending in the direction of working, and parallel to the earth worked and pivoted independently of the comminution device about an axis perpendicular to the earth worked, the positioning device being coupled with the grader blade for enabling the grader blade to be fixed in any desired position within a predetermined tilting or pivoting range.

2. The machine of claim 1 wherein the rotatable roller is arranged to crush stone to prepare a gravel road.

\* \* \* \* \*